United States Patent [19]

Dammeyer et al.

[11] Patent Number: 5,057,728
[45] Date of Patent: Oct. 15, 1991

[54] THREE STEP ELECTRIC BRAKE

[75] Inventors: Ned E. Dammeyer, New Bremen; Nicholas J. Sherman, Minster; Nicholas D. Thobe, Celina, all of Ohio

[73] Assignee: Crown Equipment Corporation, New Bremen, Ohio

[21] Appl. No.: 622,052

[22] Filed: Nov. 29, 1990

[51] Int. Cl.⁵ .......................................... H02K 7/106
[52] U.S. Cl. ..................................... 310/77; 188/171; 192/84 AB
[58] Field of Search ......................... 188/85, 171, 173; 192/84 AB, 90; 310/76, 77, 78, 93, 97, 100

[56] References Cited

U.S. PATENT DOCUMENTS

| | | | |
|---|---|---|---|
| 727,689 | 5/1903 | Reist | 192/84 AB |
| 3,750,781 | 8/1973 | Lengsfeld | 310/76 |
| 4,300,082 | 11/1981 | Angersbach et al. | 310/76 |
| 4,397,380 | 8/1983 | Yew | 310/78 |
| 4,823,926 | 4/1989 | Wittler et al. | 310/76 |

FOREIGN PATENT DOCUMENTS

| | | | |
|---|---|---|---|
| 936561 | 7/1948 | France | 192/84 AB |
| 1086383 | 2/1955 | France | 192/84 AB |

Primary Examiner—Steven L. Stephan
Assistant Examiner—D. L. Rebsch
Attorney, Agent, or Firm—Biebel & French

[57] ABSTRACT

A variable braking force electric brake for materials handling vehicles, such as fork lift trucks, utilizes two sets of springs to urge brake pads against a rotor of a disc brake. The first set of springs provide a first level of braking force, typically one-third of the total braking force. The second set of springs provide a second level of braking force, typically two-thirds of the total. A pair of electromagnetic elements act on armatures placed between the springs and a non-magnetic brake pad support plate to selectively permit either the first set of springs alone to provide braking, the second set of springs alone, or both sets together. Initially, the current to the electromagnetic elements is strong, to insure that the associated armature is pulled toward the electromagnet, and afterwards, the current is reduced to minimize heating and power requirements. The space or gap between the electromagnets and the armatures may be ascertained by means of a feeler gauge, or by examining a plunger, the end of which extends through the outer housing of the brake. The gap is determined by a set of three adjusting screws placed around the periphery of the brake housing.

8 Claims, 5 Drawing Sheets

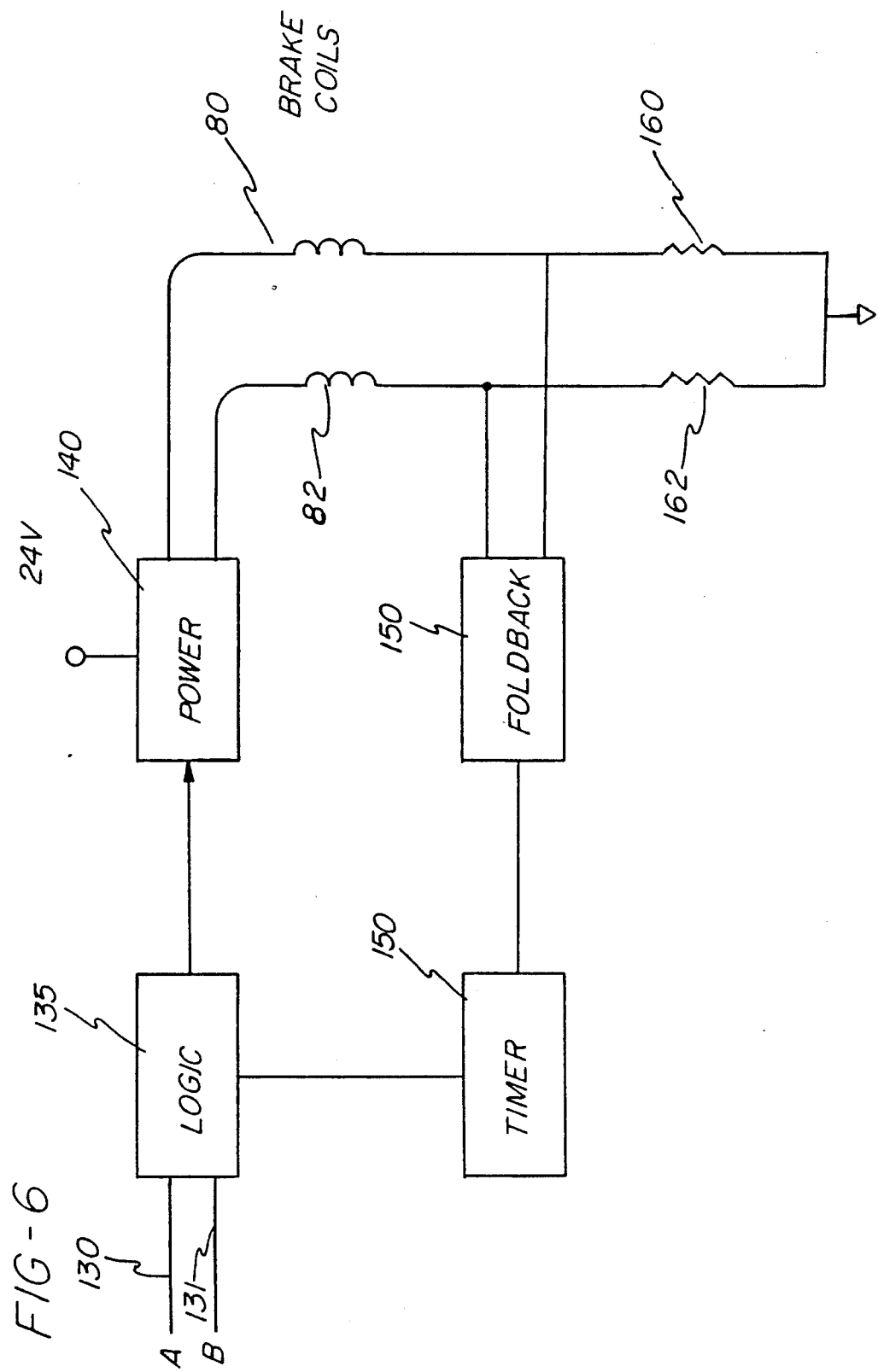

THREE STEP ELECTRIC BRAKE

BACKGROUND OF THE INVENTION

In materials handling vehicles, it is often desired to vary the amount of braking force applied according to certain factors. Hydraulic brakes provide for great flexibility in the amount of braking force applied, but hydraulic brake systems are expensive because of the required space for hardware and plumbing. Electric brakes are frequently used in materials handling vehicles, particularly electrically powered vehicles, because of their size and simplicity; however, electric brakes normally do not lend themselves to being variable in the braking force applied. Usually, they are either on or off.

In certain vehicles, it is desirable for the braking force to be varied to some extent to accommodate the configuration of the vehicle. For example, when the vehicle is moving with its load raised or when the vehicle is in a tight turn, heavy braking should be avoided. Under these circumstances, equipping the vehicle with an electric brake that applies less than full braking force would be desirable.

SUMMARY OF THE INVENTION

This invention relates to a variable braking force electric brake for materials handling vehicles, such as fork lift trucks, and particularly to an electric brake where the braking force may be controlled in response to the height of the load (which in turn controls the speed of the vehicle) and the vehicle's steering angle.

The electric brake of the present invention utilizes two sets of radially spaced springs to urge brake pads against a rotor. The first set of springs provides a first level of braking force, typically one-third of the total braking force. The second set of springs provides a second level of braking force, typically two-thirds of the total. A pair of electromagnets act on armatures placed between the springs and the brake pads to permit either the first set of springs alone to provide the braking force, or the second set of springs alone, or both sets together. Selection of the electromagnets is done by a control circuit according to the braking force desired.

Initially, the current to the electromagnetic elements is strong, to insure that the associated armature is pulled toward the electromagnet, and afterwards, the current is reduced to minimize heating and power requirements.

The space or gap between the electromagnets and the armatures may be ascertained in one embodiment by examining a plunger, the end of which extends through the outer housing of the brake. The gap is set by a set of adjusting screws placed around the periphery of the brake housing.

It is therefore an object of this invention to provide an improved electric brake which can vary the applied braking force in three increments.

It is another object of this invention to provide an improved electric brake wherein two sets of springs are used to apply braking force to a rotor, and wherein two sets of electromagnets are employed selectively to overcome the force of the springs.

It is still another object of this invention to provide a variable braking force electric brake for attachment to a rotating shaft, said brake including a brake rotor supported for rotation with the shaft, a housing fixed against rotation, brake pads associated with said housing and positioned on opposite sides of said rotor for engaging and stopping the rotation of said rotor when applied thereto, means for urging said pads against said rotor, and means for controlling said brake, wherein said urging means includes inner and outer armatures cooperating with said brake pad support elements, a first plurality of springs placed between said housing and said inner armature for applying a first level of force against said rotor, a second plurality of springs placed between said housing and said outer armature for applying a second level of force against said rotor, and wherein said means for controlling said brake includes first and second electromagnetic means mounted to said housing for interacting with said inner and outer armatures, respectively, to move said pads away from said rotor against the force of said springs, and means for selectively actuating said first and second electromagnetic means for providing a first level of braking force when said first electromagnetic means is released, a second level of braking force when said second electromagnetic means is released, and a third level of braking force when both said electromagnetic means are released, and wherein no braking force is applied when both said electromagnetic means are energized.

It is another object of this invention to provide an electric brake wherein the gap between the electromagnets and the armature may be ascertained simply by inspection of a plunger extending through the brake housing and wherein easy adjustment of this gap is accomplished by adjusting screws at the periphery of the brake housing.

Other objects and advantages of the invention will be apparent from the following description, the accompanying drawings and the appended claims.

BRIEF DESCRIPTION OF THE DRAWINGS

FIG. 6 is an electrical block diagram showing a control circuit for operating the present invention.

DESCRIPTION OF THE PREFERRED EMBODIMENT

Figure 1:
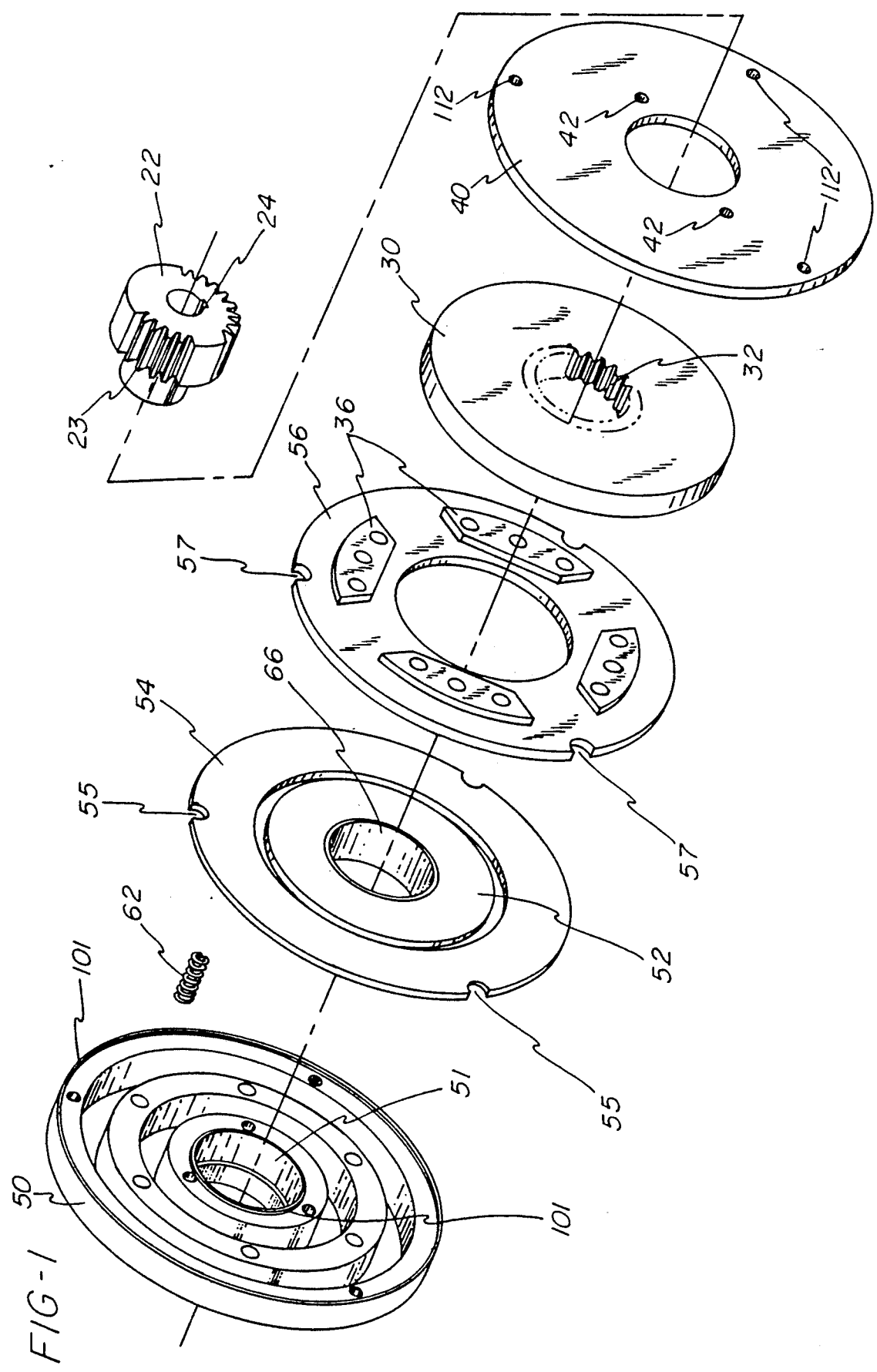
FIG. 1 is a exploded perspective view of a brake constructed according the present invention.
Figure 2:
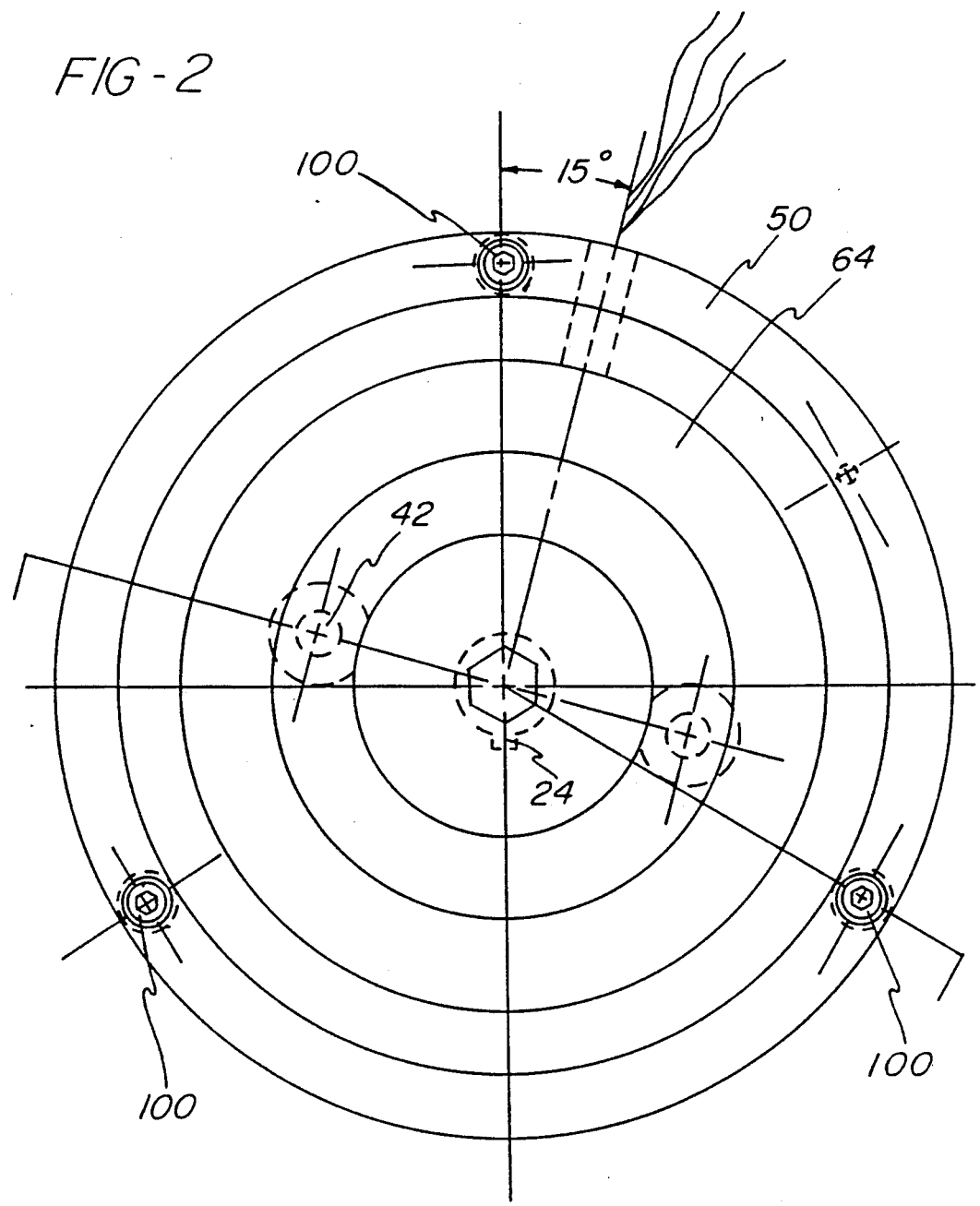
FIG. 2 is a plan view of the brake.
Figure 3:
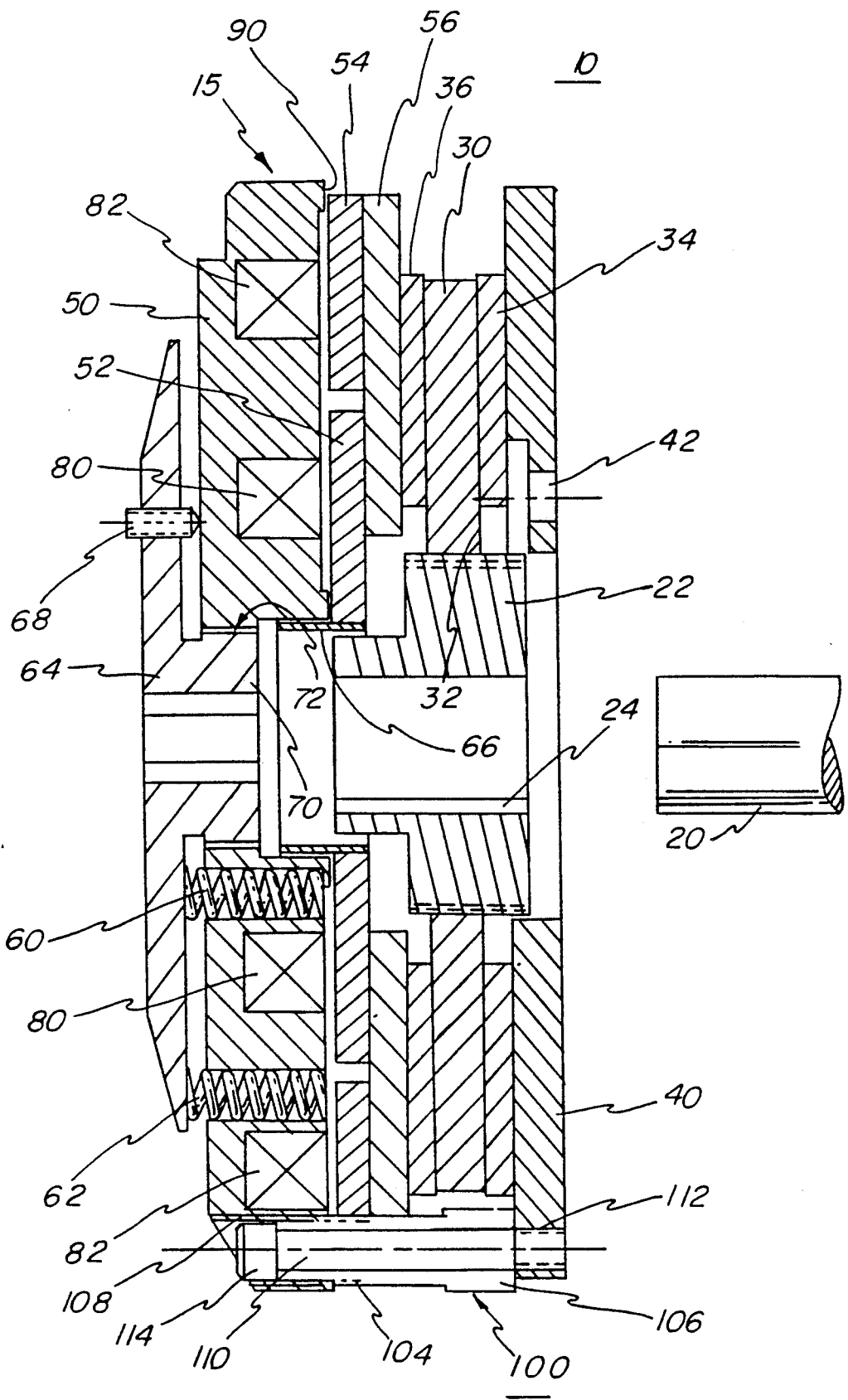
FIG. 3 is a cross sectional view taken along line 3—3 of FIG. 2.

Referring now to the drawings which illustrate a preferred embodiment of the invention, and particularly to FIGS. 1 and 2, an electric brake shown generally at 10 includes a fixed housing 15 into which a rotating shaft 20 extends. An end of shaft 20 extends into a splined hub 22 that is provided with spline 23 and a keyway 24 into which a key (not shown) may be inserted to lock the hub 22 to shaft 20 and to prevent relative rotation therebetween.

A brake rotor 30 is provided with a splined central opening for mounting on the hub 22. The rotor is movable axially with respect to the hub and shaft, but not rotationally, by action of spline 32.

A pair of annular brake pad elements 34 and 36 are positioned on opposite sides of the rotor 30 for engaging and stopping the rotation of said rotor when applied thereto. The brake pad elements 34 and 36 are conventional disc brake pads, each including four pad segments.

The housing 15 includes a mounting plate 40 onto which the brake pad elements 34 are secured, typically by riveting. Openings 42 are provided in the mounting plate 40 for mounting bolts to secure the housing to the frame of the vehicle. The housing also includes a coil body member 50 provided with a central opening 51, an inner armature member or ring 52, an outer armature ring 54 spaced radially from the inner armature ring, a brake pad pressure plate 56, a first or inner set of springs 60, a second or outer set of springs 62, a spring retainer 64, and a set screw 68.

The brake pad pressure plate 56 is a non-magnetic annular plate to which the brake pad elements 26 are attached by riveting. A pair of annular armature rings 52 and 54 is placed between the pressure plate 56 and the coil body 50. These armature rings are formed from a magnetic material, such as soft iron. Inner armature ring 52 is provided with a non-magnetic sleeve 66 that is press fit into its central opening and which extends into the central opening 51 of the body member 50. This sleeve centers the ring 52 relative to the body member.

The outer armature ring 54 includes cutouts 55, and the pressure plate 56 includes cutouts 57, which cooperate with spacers 100 to center and to prevent the ring 54 and the plate 56 from rotating. Both the plate 56 and the sleeve 66 are non-magnetic, to insure that electromagnetic means 80 and 82 act independently on the armature rings 52 and 54.

The brake pad elements 36 are urged against the rotor 30 by means of two sets of springs 60 and 62 which act between the spring retainer 64 and the armature rings 52 and 54. The force of the springs also causes the rotor 30 to slide on the spline 32 and into the brake pad 34. Thus the rotor 30 is effectively clamped between the pads 34 and 36 by the action of the springs 60 and 62.

The spring retainer 64 includes an inner hub 70 that is threaded into a threaded opening 72 in the center of the body member 50. The axial position of the retainer 64 controls the pressure exerted by the springs on the pressure plate 56, thereby controlling the braking torque. Set screw 68 locks the spring retainer 64 against rotation, once the springs 60 and 62 have been installed and the spring pressure adjusted.

The first set of springs 60 therefore acts between the retainer 64 of the housing 15 and the inner armature ring 52 for applying a first level of force against said rotor 30. In the preferred embodiment, three equally spaced springs are used. The second set of springs 62, six in the preferred embodiment, acts between the retainer 64 and the outer armature ring 54 for applying a second level of force against said rotor 30. The springs illustrated are coil springs having a spring coefficient 55 lbs/in and are formed from eleven turns of stainless steel. Alternatively, other types of spring means could be employed, such as spring washers.

The armatures 52 and 54 counteract the pressure from the springs 60 and 62, and thus remove the pressure the brake pads exert on the rotor 30 by the action of first and second electromagnetic means 80 and 82, respectively, which are supported by or mounted to the housing 15, and specifically the coil body member 50.

Circuit means are provided for selectively actuating the first and second electromagnetic means. When both electromagnets 80 and 82 are energized, both armature rings 52 and 54 will be pulled toward the electromagnets, thus pulling the pressure plate 56 and the brake pad 36 away from the rotor 30, and therefore there will be no braking force applied to the rotor when both electromagnets are energized.

When only the outer electromagnet 82 is energized, a first level of braking force will be provided by the springs 60 since the force provided by springs 62 will be neutralized by the cooperative action between the electromagnet 82 and the outer armature ring 54. When only the inner electromagnet 80 is energized a second level of braking force will be provided by springs 62 since the force provided by springs 60 will be neutralized by the action of the armature ring 52.

In the embodiment described, one-third of the braking force on the rotor 30 is provided by the action of the inner springs 60 and two-thirds is provided by the springs 62. Thus, the braking force may be controlled in three steps: by springs 60 alone, to provide a one-third braking force; by springs 62 alone, to provide a two-thirds braking force; and by springs 60 and 62 together, to provide full braking force.

An air gap 90 must be maintained at not more than a specified value between the armature rings 52, 54 and the inner face of the coil body member 50 in order for the electromagnets to function properly. The air gap is preferably $0.012 \pm 0.006$ inch. An established air gap will naturally increase as the brakes are used, since the pads 34 and 36 will wear, and eventually, the air gap 90 will become too large for the electromagnets to pull in the armature rings 52 and 54. In the present invention, the air gap is established and may be routinely adjusted by means of three equally spaced adjustable spacers 100 that support the coil body member 50 in spaced relation from the mounting plate 40.

Figure 4A:
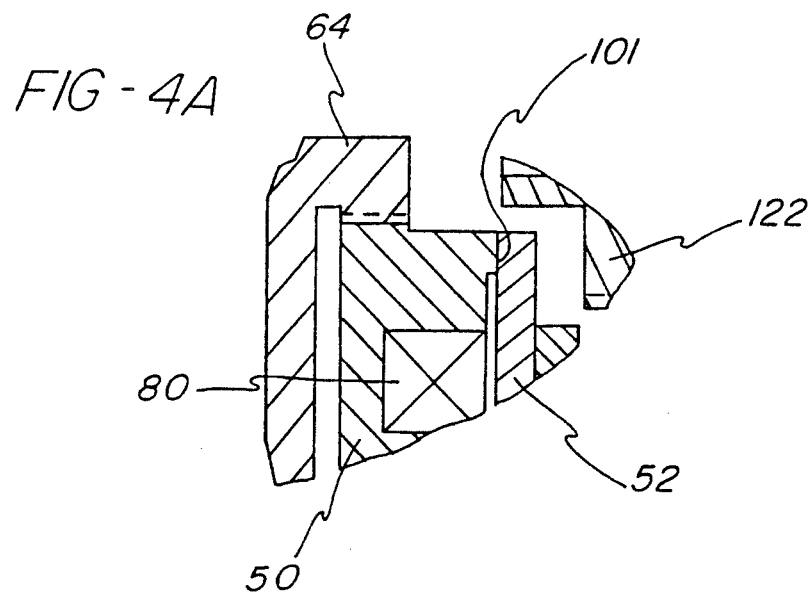
FIGS. 4a and 4b are detailed views of a ridge structure for maintaining a minimum gap between an armature and electromagnet.
Figure 4B:
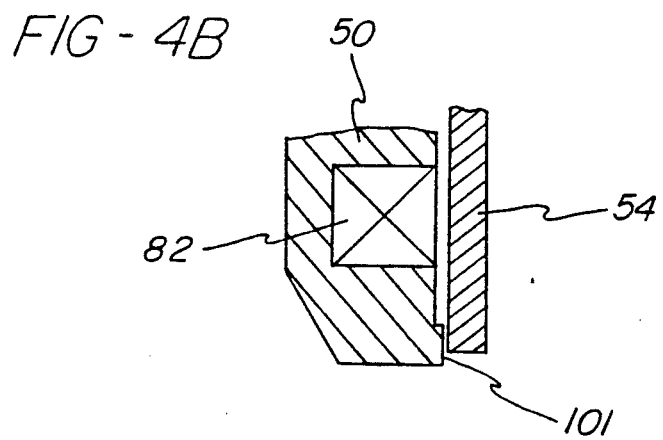

A minimum air gap of approximately 0.004 inch is also maintained between the coil body member 50 and the armature rings 52, 54. Ridges 101 formed on the face of the coil body member establish this minimum gap by keeping the main portion of the armature away from the coil body member, as shown in the detailed view of FIGS. 4a and 4b. Alternatively, the ridges could be formed on the face of the armature rings facing toward the coil body member. This minimum air gap reduces magnetic saturation and improves the release time of the armatures once current to the coils has been removed.

Each spacer 100 includes a hollow shell 102 that includes external threads at one end 104 and a hexagonal outer surface at the other end 106 adapted to receive an adjusting wrench. The external threads 104 are received into a threaded opening 108 in the outer body member 50, and therefore the spacing between the end 106, which abuts the mounting member 40, and the coil body member may be adjusted merely by turning the shell 102. A bolt 110 extends through the shell 102 and into a threaded opening 112 in the mounting plate 40. The head 114 of the bolt fits over the threaded end 104 of the shell to secure the shell and the body member in place. To adjust the gap 90, the bolt 110 is first loosened, the shell 102 is rotated until the appropriate gap is established, and the bolt retightened. It is noted that since the shoulder of bolt 110 engages the end of the shell 102, the bolt will always extend into the threaded opening 112 by the same amount, independently of the position of the coil body member relative to the mounting plate 40. The spacing of the gap 90 is readily determined by means of a feeler gauge.

Figure 5:
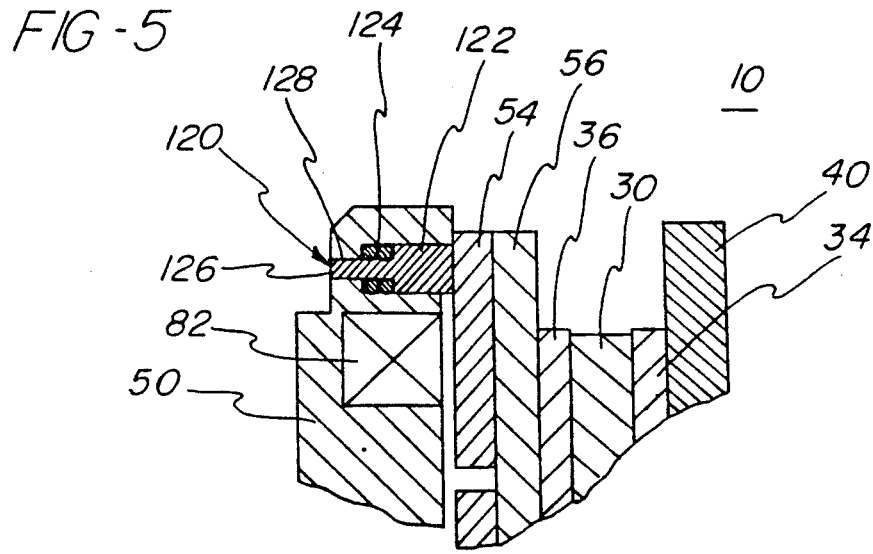
FIG. 5 is a detailed view of a plunger assembly used to determine whether the air gap in the brake assembly requires adjusting.

In an alternate embodiment is shown in FIG. 5. In this embodiment, the gap may be determined by means of plungers 120 associated with each of the adjustable spacers 100. Each plunger includes a member 122 that is urged toward the armature ring 54 by a spring 124. A smaller diameter member 126 extends through an opening 128 in the coil body member 50, and the end thereof is designed to extend from the face or outer surface of member 50 by about 0.05 inch when the air gap 90 is correct. If the end of the plunger is flush with, or inside the face of the member 50, then the air gap 90 must be adjusted. Adjustment is made easy by a 7/16-20 thread on the shell 102 which provides a 0.05 inch pitch per turn.

The circuit of FIG. 6 is a simplified electrical block diagram of a brake control circuit. Brake control signals on lines 130 and 131 are applied to logic circuit 135. To release the brakes, both coils 80 and 82 are energized, and this is accomplished by applying full battery voltage from the vehicle, typically 24 volts DC, from the power supply 140. This insures that a maximum effort is made to pull in the associated armature ring. However, once the armature ring is pulled into engagement with the coil body member, is it not necessary to continue coil energization at this level, and the voltage may be reduced by approximately three-fourths, or to 6 volts DC on a continuous basis, with a commensurate reduction in the power required to maintain that part of the brake released and therefore cooler brake operation overall. Typically, reduction in voltage level may be made about one-half second after maximum voltage was applied. Therefore, timer 150 and foldback circuit 155 will cause the current through the coils 80, 82 to be diverted through current limiting resistors 160, 162 after the appropriate delay.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. In a variable braking force electric brake including
   a rotating shaft,
   a brake rotor mounted for rotation with the shaft,
   a housing fixed against rotation,
   brake pads associated with said housing and positioned on opposite sides of said rotor for engaging and stopping the rotation of said rotor when applied thereto, and
   means for urging said pads against said rotor,
   the improvement comprising
   first and second brake pad support elements, said first brake pad support element located on one side of said rotor and said second brake pad support element located on the other side of said rotor,
   an inner armature cooperating with said second brake pad support element,
   a first plurality of springs placed between said housing and said inner armature for applying a first level of force against said rotor,
   an outer armature cooperating with said second brake pad support element and spaced radially outwardly of said inner armature,
   a second plurality of springs placed between said housing and said outer armature for applying a second level of force against said rotor,
   first and second electromagnetic means mounted to said housing for interacting with said inner and outer armatures, respectively, to move said pads away from said rotor against the force of said springs, and
   means for selectively actuating said first and second electromagnetic means for providing a first level of braking force when said first electromagnetic means is released, a second level of braking force when said second electromagnetic means is released, and a third level of braking force when both said electromagnetic means are released, and wherein no braking force is applied when both said electromagnetic means are energized.

2. A variable braking force electric brake for attachment to a rotating shaft,
   said brake including a brake rotor supported for rotation with the shaft, a housing fixed against rotation, brake pads associated with said housing and positioned on opposite sides of said rotor for engaging and stopping the rotation of said rotor when applied thereto, means for urging said pads against said rotor, and means for controlling said brake,
   wherein said urging means includes inner and outer armatures cooperating with said brake pad support elements,
   a first plurality of springs placed between said housing and said inner armature for applying a first level of force against said rotor,
   a second plurality of springs placed between said housing and said outer armature for applying a second level of force against said rotor,
   and wherein said means for controlling said brake includes first and second electromagnetic means mounted to said housing for interacting with said inner and outer armatures, respectively, to move said pads away from said rotor against the force of said springs, and
   means for selectively actuating said first and second electromagnetic means for providing a first level of braking force when said first electromagnetic means is released, a second level of braking force when said second electromagnetic means is released, and a third level of braking force when both said electromagnetic means are released, and wherein no braking force is applied when both said electromagnetic means are energized.

3. The brake of claim 2 further including means for supplying electric current to each said electromagnet means at a first level for a first predetermined period of time to provide maximum force to pull in its respective electromagnet, and thereafter for reducing said electric current to a second level sufficient to maintain said armature in contact with said coil body.

4. The brake of claim 2 wherein said housing includes a mounting plate which may be secured against rotation and a coil body member for housing said electromagnets.

5. The brake of claim 4 further including a plurality of means for adjusting the gap between said armatures and said electromagnets, each said adjusting means including a bolt having one end thereof threaded into said mounting plate, a shell surrounding said bolt and having one end thereof engaging said mounting plate and the other end provided with external threads for engagement with matching threads in said coil body member thereby to provide an adjustable spacing between said coil body member and said mounting plate, and the shoulder end of said bolt engaging the end of the threaded end of said shell.

6. The brake of claim 2 further including means for determining the gap between the said electromagnets and said armatures including means forming an opening in said coil body member, a plunger having one end thereof in contact with said armature and the other end thereof extending through said opening, and spring means urging said plunger into contact with said armature whereby the gap between the armature and said electromagnets may readily be determined visually by reference to the end of the plunger extending through said coil body member.

7. The brake of claim 2 further including means for reducing the magnetic saturation level between said electromagnetic means and said armatures including a ridge formed between each of said armatures and said coil body member to provide an air gap when said electromagnetic means are energized.

8. The brake of claim 2 wherein said brake pads support elements include a pressure plate formed form a non-magnetic material whereby said electromagnetic means act independently on said inner and said outer armatures.

* * * * *